United States Patent Office 2,844,995
Patented July 29, 1958

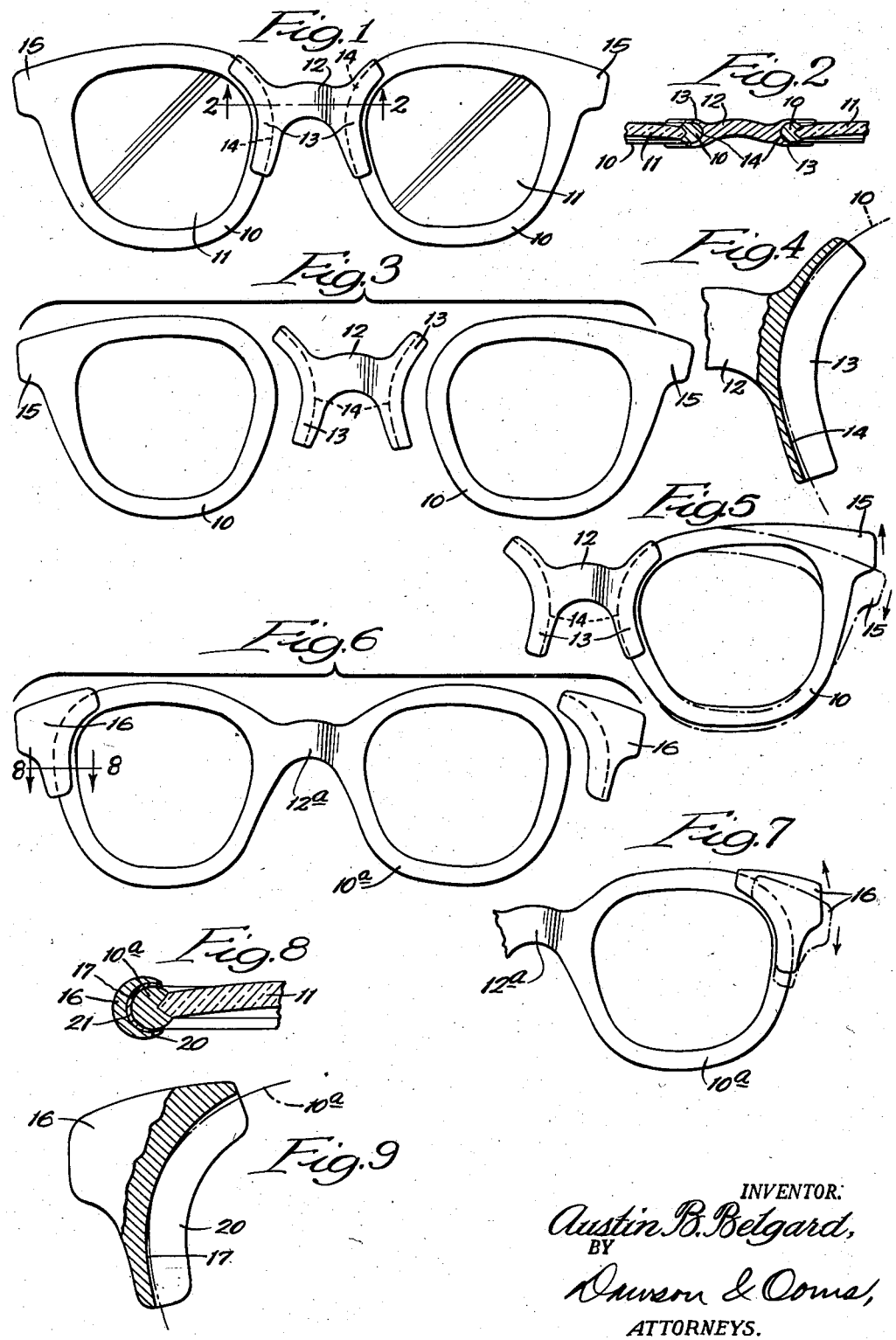

2,844,995

PRE-POSITIONING LENS RIMS AND CONNECTING SUPPORT FITTINGS THEREFOR

Austin B. Belgard, Evanston, Ill.

Application February 12, 1952, Serial No. 271,245

2 Claims. (Cl. 88—42)

This invention relates to pre-positioning lens rims and connecting support fittings therefor.

With conventional eyeglass frames, adjustment to adapt the frames to the facial contours of different wearers is greatly limited, and further such adjustment is accomplished largely by distorting the frames, whereby an intended distortion in one area usually effects an unintended distortion in another area. Further, there is no possibility in a trial adjustment to vary the positions of the bridges or endpieces (to which the temples are secured, or may be secured). There has long been a need for an eyeglass frame composed of rims and connecting support parts whereby the parts may be assembled in a frictional arrangement for trial fitting and then the parts rotated about the other to effect the relative raising or lowering of the bridge or endpieces with respect to each other and otherwise varying the shape of the complete frame to fit the wearer. After such trial fitting, the parts may be permanently secured together in their selected relative positions.

An object of the present invention is to provide an eyeglass frame in which bridges and endpieces are combined with lens rims to form a trial structure while permitting rotation of the parts with respect to each other for fitting the contour of the wearer's face. Another object is to provide a structure in which lens rims are united by a bridge structure releasably held together while permitting rotative movement between the rims and bridge. A further object is to provide an eyeglass frame in which endpieces for supporting temples are frictionally held to a lens rim while permitting the raising or lowering of the endpiece as required. Yet another object is to provide a pre-positioned lens frame and connecting support fittings therefor in which the support fittings, consisting of a bridge or endpieces, are united to the rims by the use of telescoping parts which permit rotation of the support fitting with respect to the lens rim. Other specific objects and advantages will appear as the specification proceeds.

The invention is illustrated in the accompanying drawing, in which—

Figure 1 is a front elevational view of an eyeglass frame embodying my invention; Fig. 2, a transverse sectional view, the section being taken as indicated at line 2—2 of Fig. 1; Fig. 3, a front elevational view showing the parts in disassembled relation; Fig. 4, a broken apart sectional view showing the arcuate connection between the lens rim and one side of the bridge; Fig. 5, a front elevational view showing the rotation of the rim or bridge relative to each other for the raising or lowering of the bridge and the raising or lowering of the endpieces; Fig. 6, a front elevational view of a glasses frame with endpieces adapted to removably secure to the lens rims; Fig. 7, a broken elevational view showing the rotation of the endpiece relative to the rim for the raising or lowering of the endpiece relative to the rim; Fig. 8, a broken transverse sectional view, the section being taken as indicated at line 8—8 of Fig. 6; and Fig. 9, an enlarged detail sectional view showing the arcuate connection between the endpiece and the lens rim.

In the illustration given in Figs. 1 to 5, inclusive, 10 designates a pair of lens rims provided with a lens 11. The rims may be formed of cellulose acetate or nitrate, acrylic material, or other suitable plastic material which may be employed for such purposes.

In the illustration given, a bridge 12 is employed for connecting the rims 10, and for this purpose, the sides 13 of the bridge are formed in an arcuate shape and are provided each with an arcuate groove 14 adapted to frictionally receive the rim 10, as shown more clearly in Fig. 2. The arcuate sides 13 of the bridge are resilient and may be sprung to receive the rims 10 and to grip them so that by placing the parts together as illustrated in Figs. 1 and 2 there is a temporary completion of the frame permitting a trial fitting to be made upon the patient. If the bridge should be higher relative to the rims, this may be accomplished while the frame parts are still frictionally held together. The rims 10 are shown provided with endpieces 15 which may be formed as a permanent part of the lens rim, or which may be removably secured thereto, as will later be described in connection with Figs. 6 to 9, inclusive. As shown in Figures 1 and 3-7, each of the rims 10 are slightly elongated in a generally horizontal direction and, like the rims of usual present-day spectacles, are irregular and non-circular in configuration. However, as most clearly represented in Figures 3 and 5, the upper inner corners of the rims each have an arcuate periphery with a curvature slightly less than the curvature of the arcuate grooves 14 in bridge 12. If it should be desired to raise or lower the endpieces, or to reposition the rims so that they slope outwardly and upwardly or outwardly and downwardly to suit the facial characteristics of a wearer, this may be accomplished by rotating each rim within the arcuate groove 14 of the bridge 12, as illustrated in Fig. 5. After the parts have been adjusted to the desired position so as to fit the patient accurately, the parts may be then united by the use of cement, heat-sealing, or other suitable means.

Instead of employing an integral endpiece 15, as illustrated in Figs. 1 to 5, inclusive, I may employ removable or relatively rotatable endpieces 16, as shown more clearly in Figs. 6 to 9, inclusive. The endpieces may similarly be formed of resilient plastic material and preferably are provided on their inner sides with an arcuate groove 17 flanked by resilient side flanges 20 adapted to resiliently engage and hold the lens rim 10a. If desired, the rims 10a may be secured by an integral bridge 12a, as illustrated in Fig. 6, but I prefer to employ in the new glasses frame a bridge 12, as shown in Figs. 1 to 5, and a rotatable fitting or endpiece 16, as shown in Figs. 6 to 9, inclusive.

The endpiece fitting 16 may be pressed upon the rim 10a, as illustrated in Fig. 7, to cause the endpiece to grip the rim. However, while the parts are thus frictionally held, the endpiece 16 may be raised or lowered in a rotative manner, as illustrated in Fig. 7, thus effecting a raising or lowering of the endpiece relative to the rim. The temples which are secured to the endpieces are thus raised or lowered with respect to the glasses frame. In the fitting of the glasses to the face of an individual, it is sometimes found that the temple on one side should be slightly raised, while the temple on the other side should be slightly lowered. With the present invention, this variation to enable the eyeglasses to fit the face of the wearer without distortion of the frames is successfully accomplished.

After the frame has been formed and the trial fitting effected, the endpieces 16 may be secured by cement 21, as illustrated in Fig. 8, or by other suitable means.

*Operation*

In the operation of the structure, the lens rims 10 are preferably united with the bridge structure 12 by pressing the rims 10 within the spring arms of the sides 13 of bridge 12, as shown more clearly in Fig. 2. By this means, a fixed connection between the rims is provided and the frame thus formed may be applied, just as a complete frame, to the nose of the wearer to bring about the desired fitting. By rotating the rims with respect to the bridge, a raising or lowering of the bridge is effected, and alternatively, the endpiece 15 may be raised or lowered. Since the general curvature or radius of the groove 14 in bridge 12 and of the general adjacent parts of the lens rims is substantially the same, the rotation of the parts can be accomplished without breaking the frictional engagement between the parts and while, if desired, the frame is still upon the face of the wearer.

Individual adjustment of the endpieces which support the temples may be similarly effected by the use of the endpieces 16, which have arcuate grooves of about the same radius as the radius of the rims 10a generally adjacent the endpieces, whereby the endpieces may be moved in a rotative movement about the lens rim without bringing about a separation of the parts. By rotating the endpiece 16 about the lens rim 10a, as illustrated in Fig. 7, the rim and the temple to be supported thereby may be raised or lowered. After the desired adjustment has been made, the endpiece 16 may be secured permanently in position by the use of cement 21, or other suitable means.

While the bridge 12 may be used with fixed endpieces 15, and the endpieces 16 may be used with a fixed or integral bridge 12a, I prefer to employ both the relatively movable bridge 12 and the relatively movable endpieces 16 to effect individual accommodation of the parts to the wearer. The connecting or support fittings for the lens rims, whether they be the bridge 12 or the endpieces 16, permit a complete glasses frame to be formed and, with temples secured to the endpieces in the usual manner, the frame may be placed upon the face of the wearer and by moving the rims relative to the bridge, or vice versa, and by moving the individual endpieces 16 relative to the rims, or vice versa, a complete and accurate frame is produced while the parts still are not permanently connected but are merely frictionally held together. Further, the adjustment is accomplished by a rotative movement of the parts, which does not separate them or cause a break-up of the trial frame. Also, after the trial fitting has been made and the parts placed in their proper position, the parts remain fixed in such position when they are removed from the wearer and thus can be accurately cemented or secured together in such desired relation. It will be understood that the prepositioned parts may be slightly oversize to permit the friction fitting during the trial operation. With the structure set out, there is permitted a pre-shaping of rims of eyeglasses to conform to a wide variety of desired shapes with vertical pre-positioning of the device after the shaping is finished. With conventional complete frames not having this pre-positioning feature, the variety of shapes to be considered is limited because of the distortion to the vertical position of the bridge, rims and ends resulting from extreme shapes of rims.

Under the present invention, a bridge may be selected for raising or lowering the glasses on the face or for allowing the proper fitting of glasses upon the nose, and for placing the glasses at any desired distance toward or away from the face. Further, the bridge and endpiece structure of the present invention enable one to employ substantially any shape of lens to meet the facial requirements, while at the same time properly supporting the same upon the face at the required level.

While in the foregoing specification, I have set forth specific structure in considerable detail for the purpose of illustrating embodiments of the invention, it will be understood that such details of structure may be varied widely without departing from the spirit of my invention.

I claim:

1. In an eyeglass structure equipped to provide adjustment thereof to accommodate individual facial shapes, a pair of lens rims each having a generally non-circular and horizontally elongated configuration and each being provided with an upper inner corner having a generally arcuate periphery, and a bridge connected to each of said rims along the upper inner corners thereof, said bridge having a pair of arcuate grooves adapted to receive the upper inner corners of said rims and having resilient walls extending along said grooves for frictionally and yieldably engaging said rims, whereby said rims may be rotated while frictionally engaged by said bridge into selected angular positions during adjustment of said eyeglass structure according to individual facial shapes.

2. In an eyeglass structure equipped to provide adjustment thereof to accommodate individual facial shapes, a pair of lens rims each having a generally non-circular and horizontally elongated configuration and each being provided with an upper inner corner having a generally arcuate periphery, and a bridge connected to each of said rims along the upper inner corners thereof, said bridge having a pair of elongated side walls each being provided with an arcuate groove therein having a curvature greater than the corresponding curvature of said rims along the upper inner corners thereof, the walls provided by said bridge about each of said grooves being resilient and yieldable, each of said grooves receiving an upper inner corner of one of said rims therein while the wall portions about each groove frictionally and yieldably engage the rim received within the groove, whereby each of said elongated rims may be rotated with respect to said bridge into selected angular positions ranging between a downwardly and outwardly inclined position and an upwardly and outwardly slanting position as said eyeglass structure is adjusted according to individual facial shapes.

References Cited in the file of this patent

UNITED STATES PATENTS

| | | |
|---|---|---|
| 1,227,620 | Holley | May 29, 1917 |
| 1,307,477 | Beattey | June 24, 1919 |
| 1,509,723 | Fink | Sept. 23, 1924 |
| 1,557,322 | Peck | Oct. 13, 1925 |
| 1,925,960 | Guilmette | Sept. 5, 1933 |
| 1,964,828 | Pappert | July 3, 1934 |
| 1,996,683 | Pappert | Apr. 2, 1935 |
| 2,089,237 | Welsh | Aug. 10, 1937 |
| 2,269,037 | Oker | Jan. 6, 1942 |
| 2,501,259 | Brandt | Mar. 21, 1950 |

FOREIGN PATENTS

| | | |
|---|---|---|
| 610,567 | France | June 12, 1926 |
| 358,519 | Italy | Apr. 18, 1938 |
| 562,159 | Great Britain | June 20, 1944 |